United States Patent [19]
Jonsson

[11] Patent Number: 5,909,650
[45] Date of Patent: Jun. 1, 1999

[54] TELECOMMUNICATIONS SYSTEM AND METHOD ENABLING USE OF A GENERAL PERSONAL NUMBER IN FIXED AND MOBILE NETWORKS AND CORDLESS ACCESS SYSTEMS

[75] Inventor: Ulf Jonsson, Svedala, Sweden

[73] Assignee: Telia AB, Farsta, Sweden

[21] Appl. No.: 08/630,459

[22] Filed: Apr. 10, 1996

[30] Foreign Application Priority Data

Apr. 11, 1995 [SE] Sweden ................................. 9501346

[51] Int. Cl.⁶ ........................................... H04Q 7/20
[52] U.S. Cl. ........................................... 455/461; 455/445
[58] Field of Search ................................. 455/461, 445, 455/436, 432, 433, 552

[56] References Cited

U.S. PATENT DOCUMENTS

| | | | |
|---|---|---|---|
| 4,748,655 | 5/1988 | Thrower et al. ...................... | 455/461 |
| 4,989,230 | 1/1991 | Gillig et al. ........................... | 455/552 |
| 5,297,189 | 3/1994 | Chabernaud ........................... | 455/461 |
| 5,319,699 | 6/1994 | Kerihuel et al. ...................... | 455/461 |
| 5,329,578 | 7/1994 | Brennan et al. . | |
| 5,353,331 | 10/1994 | Emery et al. ......................... | 455/445 |
| 5,440,541 | 8/1995 | Iida et al. .............................. | 455/461 |
| 5,469,496 | 11/1995 | Emery et al. ......................... | 455/445 |
| 5,506,887 | 4/1996 | Emery et al. ......................... | 455/461 |
| 5,537,610 | 7/1996 | Mauger et al. ....................... | 455/414 |
| 5,610,972 | 3/1997 | Emery et al. ......................... | 455/461 |

*Primary Examiner*—Dwayne D. Bost
*Assistant Examiner*—Tracy M. Legree
*Attorney, Agent, or Firm*—Oblon, Spivak, McClelland, Maier & Neustadt, P.C.

[57] ABSTRACT

A device and a procedure for a telecommunications system that makes possible the introduction of a general personal telephone number which functions in both fixed and mobile networks as well as in cordless access systems connected to these networks. A condition for this personal number is a central network node located at, or in connection to, these telecommunications networks (7), preferably PSTN, ISDN, GSM, NMT, without influencing network functions, numbering schemes, terminals in these networks. For a call to a subscriber located in any telecommunications network, the call, independent of from which telecommunications network the call emanates, is connected to this central network node which converts the received personal number to the specific number corresponding to the telecommunications network at which the subscriber has registered himself/herself, whereafter said network node executes connection of the call to the current access point which corresponds to the specific number.

22 Claims, 2 Drawing Sheets

TELECOMMUNICATIONS SYSTEM AND METHOD ENABLING USE OF A GENERAL PERSONAL NUMBER IN FIXED AND MOBILE NETWORKS AND CORDLESS ACCESS SYSTEMS

TECHNICAL FIELD

The present invention relates to a device and a procedure used in a database communications and telecommunications system (communications network) which makes possible the introduction of a general personal telephone number which functions in both fixed and mobile networks as well as in cordless access systems connected to previously mentioned communications network.

PRIOR ART

Today all telephone networks have numbers that correspond to a fixed access point (a telephone jack), a certain terminal (NMT-telephone) or possibly a certain card (GSM's SIM-card). The different networks have their own number series and the mobile telephone networks have their own number series; in Sweden for instance 010 is the number series for NMT, and 0705 is the number series for Telia's GSM.

Before long, functions will turn up in the fixed networks which support mobility of cordless telephones between cordless access systems (for instance DECT), called CTM (Cordless Terminal Mobility). A specific terminal identity is used for incoming calls to the terminal and to identify the terminal for outgoing calls. This identity must follow the numbering schemes which are used in the fixed networks (E. 164).

Users, however, do not want to keep in mind a set of numbers depending on where the destination user is located or which terminal he/she is using at the moment. A number which uniquely identifies the user, a personal number, is required.

Within ETSI and ITU an international standard for personal numbers is approaching completion; Universal Personal Telecommunications service (UPT). Here the user and not the terminal has a unique identity of its own. Phase one which is concentrated on the fixed network (PSTN) was completed during 1994. The specification of phase two, which also includes GSM, has recently started. Because the fixed networks are lacking mobility functions, and for other technical and safety reasons, complicated user procedures, tone transmitters etc. are required. Since UPT phase 1 is restricted to the fixed networks, the UPT-number must in the same way as is described above, follow the fixed network numbering scheme (E.164) and correspond to a number of its own.

The use of cards for registration and use of services will improve the user interface. Today there are SIM-cards for GSM, and before long the equivalent to DECT, DAM will be approved as a European standard. A special UPT-card is under development, and ETSI's work group TE9 has produced a standard for multi-application cards for, instance telecommunications and bank services. The coordination between these standards has been arranged, but complete compatibility does not exist. This consequently implies that one card is required for each network/service.

The mobile telephone networks' equivalent to personal numbers is GSM's SIM (Subscriber Identity Module), but this only allows access an operator's own network, or the networks of "allied" operators and only with a GSM telephone.

To sum up, one can say that the fixed telephone networks of today have telephone numbers corresponding to a certain place, and the mobile telephone systems of today have telephone numbers related to a certain terminal or card. A network service which allows that cordless telephones to be used in many places, public and private, is under standardization, and the number is related to a certain terminal or a certain card. A standardized personal telephone number will in the long run function in all systems and terminals, but in the mean time the standardization work is proceeding slowly and the user procedures will ultimately be complicated.

The aim with the present invention is to introduce a general personal telephone number which functions in all fixed and mobile networks as well as in cordless access systems connected to these networks. Further aims with the present invention are to simplify (automate as far as possible and in an appropriate way) the user procedures, at least for the use of a personal number in a user's own mobile or cordless terminal, and to rapidly meet the demands of the market by preceding the slow standardization work and at the same time create a competition advantage by implementing concrete, specific solutions.

SUMMARY OF THE INVENTION

The invention relates, as has been mentioned above, to create for each subscriber one general personal number which can be used in all existing telecommunications networks and in cordless access systems connected to these networks. This is achieved by placing a central network node at, or in connection to, existing networks, and including one personal number for each respective subscriber user specific service profile. In central network node additionally includes provisions for storing, for example, a current routing address, addresses to a personal voice mail box and other existing services, as well as necessary administrative information such as debiting parameters, invoice addresses etc. When calling to the subscriber, the call, independent of from which type of network the call emanates, is connected to the central network node which converts the received number to the number at which the subscriber has registered himself/herself. Then the central network node executes the connection to the current access point in the network. Once that is achieved, one personal subscriber number corresponding to the subscriber permits he/she to be reached by calls independent of which telecommunications network the subscriber is connected. Further, the central network node identifies a user on outgoing calls by the related terminal identity and thus allows a debiting collection.

The invention consequently gives the network operator possibility, in the existing mobile telephone networks, for instance NMT, GSM (without influencing network functions, numbering schemes or terminals), in fixed networks, for instance PSTN, ISDN for fixed and cordless access, for instance DECT with addition of a central network node and only at manual registration by means of the user procedures, to offer the customer a personal number for all mobile and fixed services and a debiting collection service.

Further characteristics of the present invention as discussed herein are also described in detail in the patent claims that follow at the conclusion of this specification.

The invention will now be described in more detail below with reference to the enclosed drawings.

DETAILED DESCRIPTION OF A TECHNICAL REALIZATION OF THE INVENTION

AND A DESCRIPTION OF A NUMBER OF ILLUSTRATIVE SCENARIOS

Figure 1:
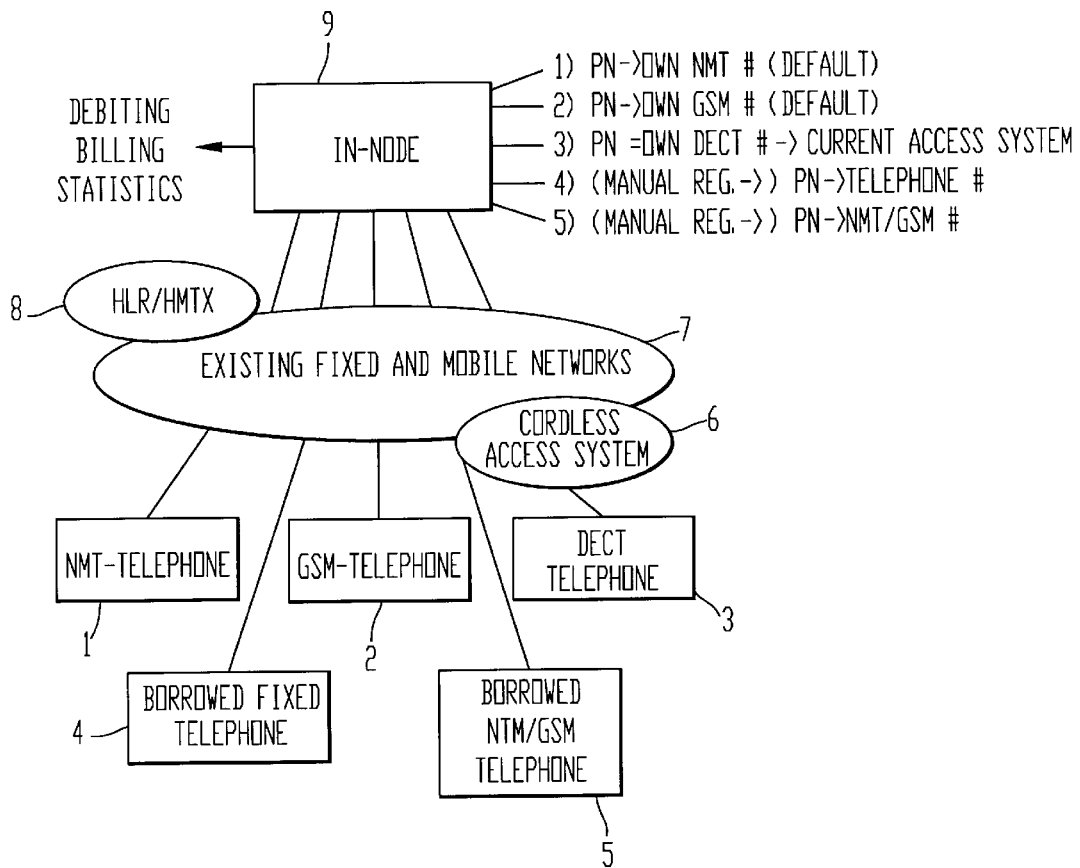
FIG. 1 shows schematically the central-network node and the existing telecommunications systems.

The present invention permits operators to offer the customer a number which can be used in both NMT and GSM, as well as in DECT and fixed telephones. A number of scenarios will now be described to illustrate the different possibilities.

Assume a customer has NMT-telephone 1 as his/her normal access (default routing access). With a personal number he/she need not do anything special to use it (and to be debited for its use), neither for incoming or outgoing calls. Registration is not required, since the central network node in the normal position or in the "default"-position is adjusted to or related to a terminal identity 1), 2) in NMT or GSM.

Another customer has a GSM-telephone 2 as his/her normal access. When he/she uses his/her own GSM-telephone or a borrowed GSM-telephone, he/she uses his/her SIM-card, at which the central network node 9 directly relates this telephone to his/her personal number. In the same way as is described above, no special user procedures, telephones or new network functions in addition to the central network node 9, are required.

The customer may also have a cordless telephone 3. When the cordless telephone 3 comes into the coverage area of a cordless access system 6, an automatic registration-process can be initiated, which causes the current registration address to change in the central network node 9 from the mobile telephone to the access system 6. No user procedures are required. The customers also can register themselves at a borrowed fixed or cordless telephone 3. NMT-telephone 1 or GSM-telephone 2 with somebody else's SIM-card for incoming or occasional outgoing calls (and personal debiting) by manual registration. In this case it is needed that the customer actively informs the central network node 9 where he/she is, for instance at a fixed telephone, by manually keying a code on the keyset. Consequently extended user procedures are required. One way to simplify the user's handling is to use a number transmitter. This can be a separate unit or the abbreviated number memory of the own telephone. In principle, a number transmitter is not required, but the amount of figures which are transmitted is extraordinary big, and the procedure is not user friendly.

The personal number is used to identify the subscriber and this functions as an account number and the customer can get a debiting collection from the mobile telephone operator for all his/her use of services in the fixed and mobile networks.

A condition for the general personal number is a central network node 9 (suitably according to IN-technology; intelligent Network) in the network. It constitutes the heart in the concept where the personal number is created, terminal identified and service is adminstered.

The personal number defines a personal service profile which is stored in the network node and which can be accessed by the customer for certain modification. Here a normal or current routing address is stored, addresses to a personal mail box and other services are stored, as well as administrative information such as debiting information, invoice address etc. are stored.

Due to the fact that the execution of the service is managed by the IN-node, the introduction of the personal number need not influence the fixed NMT- or GSM-networks of today. Fixed telephones, NMT-telephones and SIM-cards preserve their identities. For an incoming call, conversion is made from the keyed (personal) number to a current number (NMT, GSM, fixed or cordless telephone) in the network node. For outgoing calls the user of the NMT-telephone, the SIM-card, the cordless telephone (or its DAM-card) or the identification and authentication procedure, which is managed by the number transmitter, is defined.

Two changes of the network of today provide a more efficient mobility management relate to the possibility of direct communication between the network node 9 and GSM's HLR 8, respective NMT's HMTX 8, and the introduction of a new functionality in AXE local station, called MMF (Mobility Management Function). In addition, the IN-node should be separated in a central (home) node, and a number of local (visiting) nodes. This structure is in accordance with Telia's IN-strategy.

The first change is restricted and comparatively easy to realize, whereas the second one is more expensive due to the big number of local stations which must be upgraded. The procedures, which will be described later, presuppose the two changes. The functional architecture which is implied for the cordless access is described below with reference to FIG. 2.

The functionality for mobility in public fixed networks is localized to separate IN-nodes and/or in the local and transit exchanges (LX and FX respectively). In the near term, SSF-functionality will exist in FX, but in the long run there will also be a possibility to place it in all LX. There are advantages and disadvantages with all these alternatives, but here the last alternative has been chosen.

The local stations include, in addition to CCF, SRF and SRF a functional unit for management of CTM (MMF).

Figure 2:
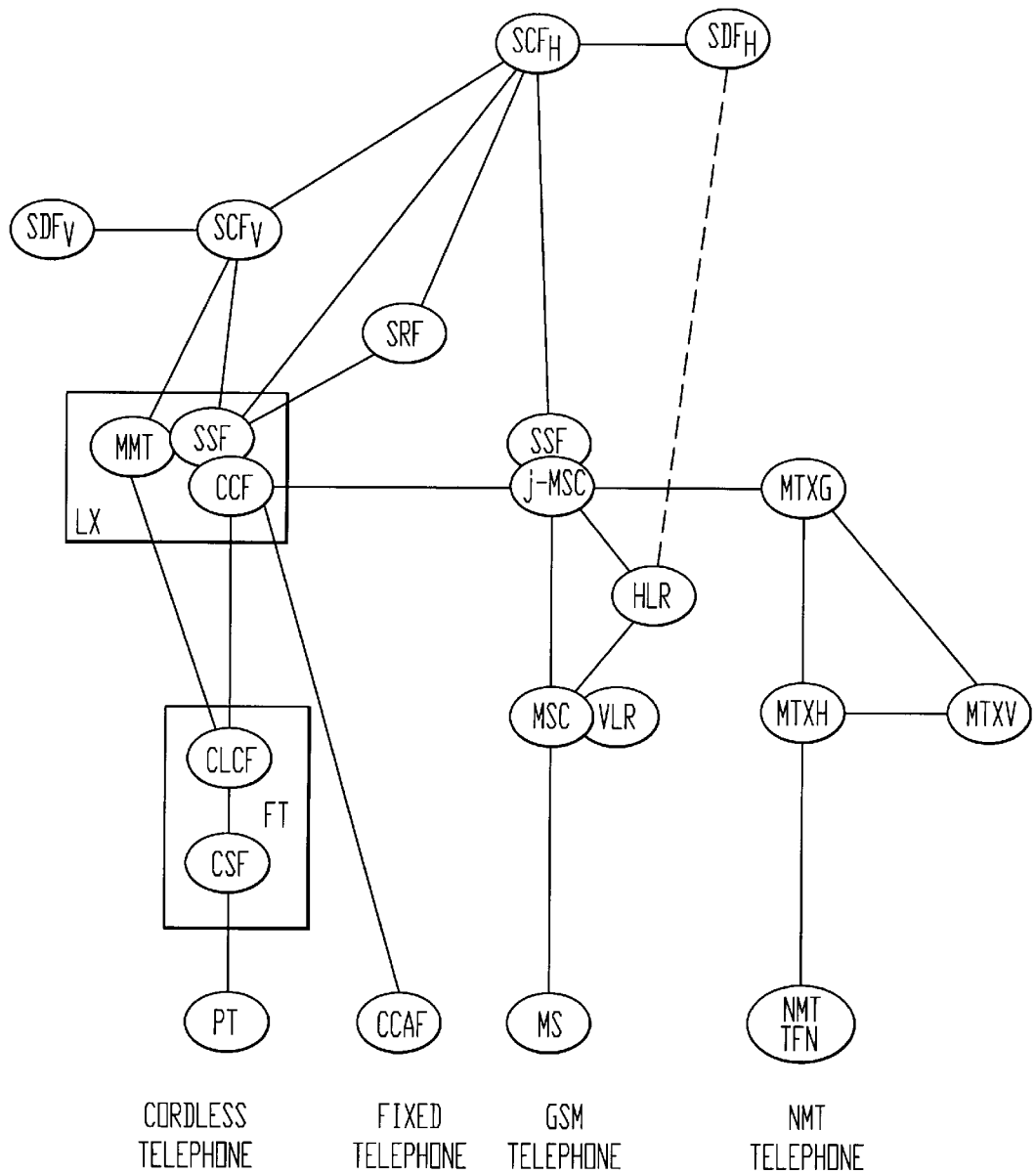
FIG. 2 shows schematically the architecture of the network node and the existing telecommunications systems.

Two levels of IN-nodes are also included in the architecture, i.e. $SCF_V/SDF_V$ and $SCF_H/SDF_H$ (see FIG. 2). These manage local (visit, temporary) respective central (home, permament) service control and data management for mobile users.

Two access forms are included in the architecture. CCAF is realized in a conventional keyset code telephone for personal mobility and CSF/CLCF is realized in a cordless access system (FT) for terminal mobility. The PT-functionality exists in the cordless terminal.

Below is described a number of procedures for the above mentioned scenarios:

Automatic registration of personal number/cordless telephone number in cordless access system.

Incoming call to personal number/cordless telephone number registered in cordless access system.

Outgoing call from personal number/cordless telephone registered in cordless access system.

Manual registration of personal number at borrowed fixed telephone.

Incoming call to personal number registered at borrowed fixed telephone.

Outgoing call from personal number registered at borrowed fixed telephone.

These procedures describe the information which flows between involved network nodes. They intend to give a somewhat more than detailed description of the invention and its influence on network functions and user procedures.

The first three cases imply cordless telephony and cordless access system according to the DEC-standard (GAP-compatible) and communication with the IN-node, which is called CTM (Cordless Terminal Mobility).

It should be emphasized that no procedures for management of the personal number are performed in the mobile telephone system, as no such specific handling as we know according to what has been described is performed.

What has been described above of the present invention is only to be regarded as example and the invention is only restricted by what is indicated in the patent claims.

What is claimed is:

1. A calling method comprising the steps of:
   initiating a call from at least one of a first telecommunications network and a cordless access system to a subscriber located in at least one of a second telecommunications network and a second cordless access system, including DECT;
   registering the subscriber in the second telecommunications network with a specific number that corresponds to a current access point in the at least one of a second telecommunications network and a second cordless access system; and
   connecting the call to the subscriber through a central network node, including the steps of,
      transmitting within the call a general personal number corresponding to the subscriber,
      connecting the call having the general personal number contained therein at the central network node, regardless of which type of telecommunication network the call emanates from or form of the call,
      converting in the central network node the received general personal number to the corresponding specific number that corresponds with the current access point, and
      executing a connection to the current access point, so that the connection is made independent of the at least one of the first telecommunications network and the cordless access system from which the call is initiated and independent of the at least one of the second telecommunications network and the cordless access system in which the subscriber is located, wherein said connecting step includes connecting the central network node to at least one of the first telecommunication network and the second telecommunications network without influencing a function of either respective network, a numbering scheme of either respective network, or a terminal in either respective network, said executing step includes realizing a direct communication between the central network node and at least one of a HLR of a GSM system and a HMTX of a NMT system.

2. The method of claim 1, wherein said connecting step includes connecting the central network node to at least one of the first telecommunications network and the second telecommunications network without influencing a function of either respective network, a numbering scheme of either respective network, or a terminal in either respective network.

3. The method of claim 2, further comprising the step of:
   using at the central network node an automatic registration function of at least one of a mobile telephone network and a cordless telephone system.

4. The method of claim 1, wherein the central network node relates the personal number to a corresponding terminal identity in at least one of a NMT system and a GSM system.

5. The method of claim 1, further comprising the steps of:
   relating the personal number within the central network node to a current access point in the second cordless access system; and
   registering automatically a cordless telephone in the second cordless access system.

6. The method of claim 1, wherein said registration step is a manual registration step and said central network node relates the personal number to a current fixed access point.

7. The method of claim 6, wherein said registering step includes using a telephone jack for the current fixed access point.

8. A method according to claim 1, further comprising the step of:
   managing a number conversion from a dialed number of an incoming call to at least one of a related mobile terminal identity, a related cordless access point, and a related fixed access point.

9. A method according to claim 1, further comprising the step of:
   identifying in the central network node a user who placed an outgoing call to a corresponding terminal identity, thereby facilitating debit collection.

10. The procedure according to claim 1, further comprising the step of:
    introducing a mobility management function into an AXE local station of the central network node so to enhance mobile management efficiency.

11. The method of claim 1 wherein said connecting step includes:
    locating the central network node in at least one of the first telecommunications network and the second telecommunications network without influencing a function of either respective network, a numbering scheme of either respective network, or a terminal in either respective network.

12. The method of claim 1 wherein said the initiating step includes using as the first telecommunications network being at least one of a PSTN, an ISDN, a GSM, and a NMT system.

13. A system using at least one of an existing telecommunications network and a cordless access system connected to said existing telecommunication network, comprising:
    means for initiating a call from a calling subscriber to the existing telecommunications network in which the calling subscriber is located, said means for initiating a call includes transmitting within the call a personal number corresponding to a called subscriber, said called subscriber being registered in a second telecommunications network; and
    a central networking node connected to the existing telecommunications network without influencing a function of the network, a numbering scheme of the network, and a terminal of the network, comprising,
       means for connecting the call with the central networking node, regardless of which type of telecommunication network the call emanates from or form of the call,
       means for receiving the personal number at the central network node,
       means for converting the personal number to a specific number corresponding to a current access point of the second telecommunications network, and
       means for executing a connection of the call to the current access point, said means for executing includes means for realizing a direct communication between the central network node and at least one of a HLR of a GSM system and a HMTX of a NMT system.

14. The system of claim 13, wherein said central network node is located at said existing telecommunications network.

15. The system of claim 13, wherein the second telecommunications network is the same as the existing telecommunications network.

16. The system according to claim 13, wherein said central network node includes means for defining the personal number as a user specific service profile that includes at least one of a current routing address, a personal mail box address, a debiting parameter, and an invoice address.

17. The system according to claim 13, wherein the central network node includes means for relating the personal number to a current access point of a cordless telephone access system for automatic registration of a cordless telephone in the cordless telephone access system.

18. The system according to claim 13, wherein the central network node includes means for relating the personal number to a current fixed access point for manual registration.

19. The system according to claim 18, wherein the current fixed access point is a telephone jack.

20. The system according to claim 13, wherein said central network node is an Intelligent Network node.

21. The system according to claim 20, wherein the central network node includes a first IN-node level for management of local respective central service controls and a second IN-node level for data management for a mobile user.

22. The system according to claim 21, wherein the mobile user is a cordless access system user.

* * * * *